(12) United States Patent
Borys et al.

(10) Patent No.: US 7,739,339 B2
(45) Date of Patent: Jun. 15, 2010

(54) SYSTEM AND METHOD OF COMMUNICATIONS WITHIN A VIRTUAL ENVIRONMENT

(75) Inventors: Nick J. Borys, Longmont, CO (US); James L. Liebbe, Colorado Springs, CO (US); Nathan L. Thrasher, Colorado Springs, CO (US)

(73) Assignee: The Boeing Company, Chicago, IL (US)

( * ) Notice: Subject to any disclaimer, the term of this patent is extended or adjusted under 35 U.S.C. 154(b) by 708 days.

(21) Appl. No.: 11/477,114

(22) Filed: Jun. 28, 2006

(65) Prior Publication Data

US 2008/0005237 A1    Jan. 3, 2008

(51) Int. Cl.
*G06F 15/16*   (2006.01)
*G04F 3/00*    (2006.01)
*H04B 11/00*   (2006.01)

(52) U.S. Cl. .............. 709/206; 709/201; 709/202; 709/204; 709/230; 709/232; 370/260; 370/265; 710/11

(58) Field of Classification Search ............... 709/203, 709/201, 202, 230, 232
See application file for complete search history.

(56) References Cited

U.S. PATENT DOCUMENTS

| | | | |
|---|---|---|---|
| 5,867,667 A * | 2/1999 | Butman et al. ............. 709/249 |
| 6,078,948 A * | 6/2000 | Podgorny et al. ........... 709/204 |
| 6,671,695 B2 * | 12/2003 | McFadden .................. 707/102 |
| 6,675,197 B1 * | 1/2004 | Satoh et al. ................. 709/204 |
| 7,028,051 B1 * | 4/2006 | McMullan et al. ........ 707/104.1 |
| 7,433,324 B2 * | 10/2008 | Switzer et al. ............. 370/254 |
| 7,512,788 B2 * | 3/2009 | Choi et al. .................. 713/163 |
| 2001/0042104 A1 * | 11/2001 | Donoho et al. ............. 709/207 |
| 2002/0010744 A1 * | 1/2002 | Prell et al. .................. 709/205 |
| 2003/0236895 A1 * | 12/2003 | Ohkubo et al. ............. 709/229 |
| 2004/0111612 A1 * | 6/2004 | Choi et al. .................. 713/163 |
| 2005/0097169 A1 * | 5/2005 | Mukherjee et al. .......... 709/204 |

\* cited by examiner

*Primary Examiner*—Rupal D Dharia
*Assistant Examiner*—Tom Y Chang
(74) *Attorney, Agent, or Firm*—Tung & Associates

(57) ABSTRACT

A system and method of dynamic communications within a virtual environment. The virtual environment provides at least two virtual communities each having an associated cross protocol proxy server and a cross community server that cooperate to allow collaboration between participants within the virtual environment using multiple collaboration technology applications. Ad-hoc log-on of groups of individual participants under one community user name is provided to allow different communication protocols to be used and information to be shared across at least two virtual communities.

21 Claims, 5 Drawing Sheets

SYSTEM AND METHOD OF COMMUNICATIONS WITHIN A VIRTUAL ENVIRONMENT

FIELD OF THE INVENTION

The present invention generally relates to systems and methods to support dynamic user collaboration over computer networks.

BACKGROUND

Collaboration technologies over computer networks bring individuals together for collaboration relating to specific or ad-hoc topics. As virtual communities have evolved, there are a variety of technical approaches being used to connect individuals in collaborative sessions. These virtual communities increasingly require participation from individuals and groups in collaboration sessions from outside of their localized virtual community.

When combining remote virtual communities, some collaboration discussions in the localized virtual community will need to be kept local, while some collaborative discussions need to be shared with other remote virtual communities.

Traditional collaboration technology maintains a 1:1 relationship between users and presence information. Each client is represented by their individual User ID appearing in a collaboration client user-list.

Virtual communities are evolving to Network Centric Operations that collaborate as communities instead of individuals. The collaborative approach of the present invention enable virtual communities to coordinate activities and take advantage of broad groups of knowledge in finding solutions to immediate challenges.

Network Centric Operations increase the demand for online collaboration. As the demand for online collaboration increases, the number of potential users can quickly become unmanageable.

However, mistakes may be made by participants within a collaborative environment and the wrong conclusions may be reached by participants of conventional Network Centric Operations because participants may be inadvertently left out of group discussions.

Traditional collaboration integration approaches provide the ability to connect individuals using the same collaboration technology to individuals that are part of a intra- or inter-community.

Traditional collaboration integration approaches also provide the ability to connect individuals to individuals using different collaboration technologies to individuals within an intra- or inter-community.

While existing devices suit their intended purpose, there remains a need for a system and method that connects virtual communities using either the same or different collaboration technologies including specific and ad-hoc collaboration.

SUMMARY

The present invention addresses the ability to connect remote virtual communities using specific or ad-hoc collaboration.

A system and method of dynamic communications within a virtual environment is provided. The virtual environment provides at least two virtual communities each having an associated cross protocol proxy server and a cross community server that cooperate to allow collaboration between participants within the virtual environment using multiple collaboration technology applications. Ad-hoc log-on of groups of individual participants under one community user name is provided to allow different communication protocols to be used and information to be shared across at least two virtual communities.

The system and method of the present invention addresses the need to connect virtual communities in specific or ad-hoc collaboration sessions with each other without having to invite all of the individuals in a remote virtual community into the localized virtual community.

More particularly, a system and method is provided that use a cross community proxy in combination with a cross protocol proxy to allow communication by individuals or groups of individuals forming one or more virtual communities to communicate with each other using either the same or different collaboration technologies.

BRIEF DESCRIPTION OF THE DRAWINGS

These and other objects, features and advantages of the present invention will become apparent from the following detailed description and the appended drawings in which.

DETAILED DESCRIPTION OF THE INVENTION

Figure 1:
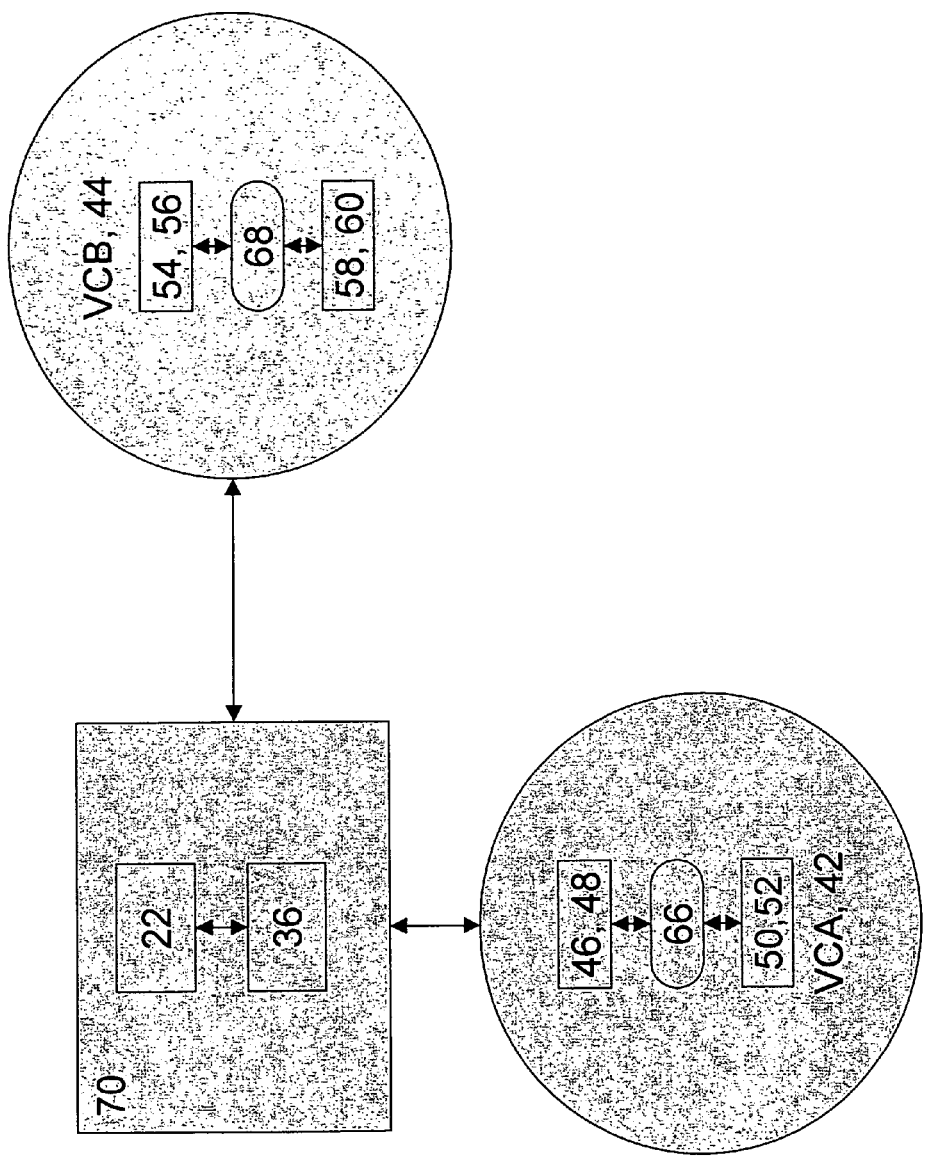
FIG. 1 illustrates a system flow diagram of the virtual environment in accordance with an embodiment of the present invention
Figure 2:
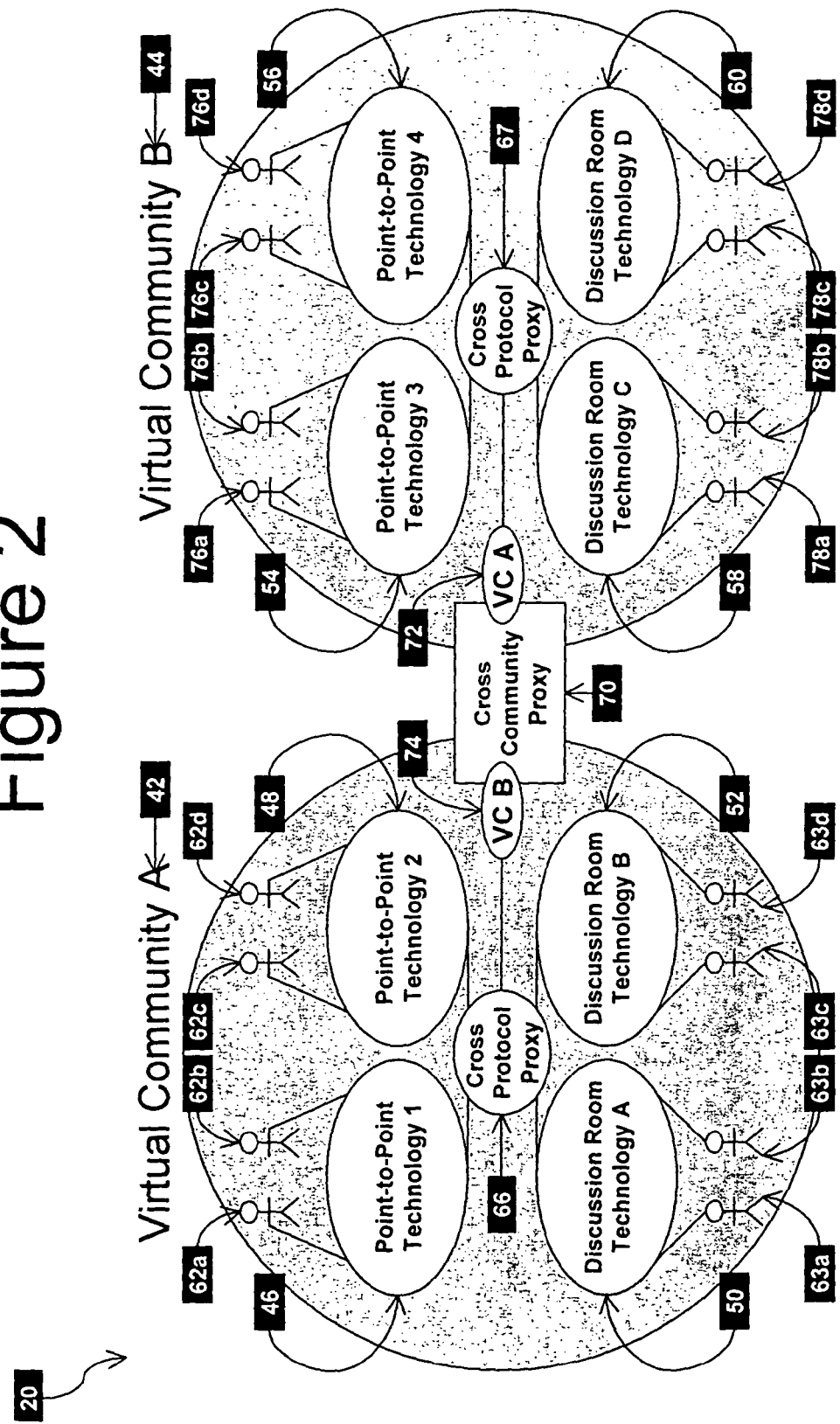
FIG. 2 illustrates an architecture of the virtual environment shown in FIG. 1.

Aspects of the invention are illustrated by way of example and not by way of limitation in the figures of the accompanying drawings in which like references indicate similar elements. It should be noted that references to "an", "one", "various" and "further" embodiments in this disclosure are not necessarily to the same embodiment, and such references mean at least one. In the following description, numerous specific details are set forth to provide a thorough description of the invention. However, it will be apparent to one skilled in the art that the invention may be practiced without these specific details. In other instances, well-known features have not been described in detail so as not to obscure the invention.

Generally provided is a system for communications in a virtual environment providing a first virtual community; a second virtual community in collaborative communication with the first virtual community, wherein the first and second virtual communities each have an associated plurality of clients each in operative communication with at least one cross protocol proxy server and with at least one cross community proxy server; at least two cross protocol proxy servers, a first and a second proxy server that each operate to provide cross protocol communication between each of the plurality of clients within each of the first and second virtual communities; and at least one cross community proxy server providing a cross community protocol for cross community communications between each of the first and second virtual communities, wherein the first virtual community and the second virtual community define the virtual environment.

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The system and methods provided in this collaboration approach of the present invention provide discrete control over the flow of information for collaboration between virtual communities, specific and ad-hoc collaboration session invitation to virtual communities, and uses standard approaches to connecting different collaboration technologies. The approach disclosed herein is fully compatible with conventional approaches to connecting individuals to individuals across virtual communities.

By allowing virtual communities to collaborate with each other in specific or ad-hoc collaboration sessions, groups of individuals can be brought into a discussion with a single invitation to the community, allowing dynamic collaboration to bring in teams of people from other virtual communities quicker than conventional approaches.

The approach of the present invention allows individuals to contribute as groups of individuals within virtual communities as participants across two or more virtual communities forming a virtual environment.

In a non-limiting aspect of the present invention, the present system and method is directed to specific collaboration technologies such as, but not limited to text messaging capabilities of these collaboration technologies.

Instant message servers and internet relay chat servers are connected to the present system for communication. IM messaging is an asynchronous form of communication comprising routed messages and provides ad-hoc collaboration between individuals within a virtual community, or between virtual communities. IM server represents any of the widely available and known instant message services like AOL™, Microsoft™, and ICQ™, and others including those that leverage presence protocols. The internet relay chat server represents any chat room server that provides multi-user or room-style also known as "specific" collaboration between groups of individuals within a virtual community or between virtual communities.

However, it is contemplated that the present system and method be extended to any collaboration technology that has come or may come into existence such as, but not limited to text messaging, whiteboard, audio, video, and file sharing.

The collaboration technology of the present invention provides a mechanism for virtual communities of interest to be grouped together and appear in a discussion room or participant list using a single Group User ID.

A cross community protocol is used to associate the single group user ID with an associated virtual community.

A proxy message packet is sent via both a cross protocol proxy server and a cross community proxy server, wherein the proxy servers are used to allow a virtual community to log on to a virtual environment. When the message packet is received by one or more participants within a remote virtual community, wherein the message packet received is identified as originating from a single group User ID. The message is sent to each of those participants in the remote community. When a participant sends a message packet, the message is transmitted to the remote virtual community as a message from the group user ID. This is accomplished through use of both a cross community proxy and a cross protocol proxy.

The use of a cross community proxy in combination with a cross protocol proxy allows communication by individual participants or groups of participants using multiple communication protocols.

When a message packet is sent using the group User ID representing all of the participants in a virtual community, the packet is distributed to each of the individual members of the remote virtual community of interest.

When a single user of the virtual community of interest transmits a message packet, the packet appears to be from the Group User ID representing the virtual community of interest.

The proxy server may be an anonymous proxy server that operates to hide or supplies information about an individual user ID but identifies the Group User ID to the recipient participants within the remote virtual community.

In this way, the details of the origin of a message packet from within the originating virtual community can be hidden and it is only known that a particular community has transmitted a message packet and not that a particular individual or client from that community has transmitted a message packet.

Additionally, the collaboration service provides for interoperability between multi-vendor collaboration technologies. Virtual communities of interest can participate in ad-hoc collaboration such as Instant Messaging Chat, for instance, as well as specific multi-user/room-style collaboration such as Chat Room/Internet Relay Chat (IRC).

The structure in the collaboration system and method of the present invention provides both cross protocol proxy servers, to provide communication between participants employing both or one of ad-hoc and specific multi-user/room-style collaboration technologies, and cross community proxies allowing individual participants or groups of participants within each virtual community to connect individual participants or groups of individual participants within remote virtual communities. The present system and method simplifies user management challenges faced by connecting existing virtual communities to other existing virtual communities.

The collaboration approach of the present invention provides the ability to connect individual participants simultaneously to individual participants using the same and different collaboration technologies and to groups of individual participants in different virtual communities using different collaboration technologies.

The collaboration approach of the present invention groups users into virtual communities of interest, allowing effective collaboration between larger groups of clients. More informed, timely and accurate decisions can be made as more individuals and communities of interest can collaborate without creating unmanageable participant lists.

There are two types of collaboration technologies, specific collaboration defining synchronous communication between groups of participants within a virtual environment allowing for simultaneous communications between the groups of individual participants such as individuals who participate in point to point technology, and ad hoc collaboration defining asynchronous communication between individual participants within a virtual environment individual collaboration technology. Two chat paradigms include Instant Messaging providing an ad-hoc collaborative technology for individual participants, and Room based chat providing a specific collaborative technology for groups of individual participants.

In various embodiments, systems and methods for providing collaboration among users in the context of a virtual environment formed from one or more virtual communities. In aspects of these embodiments shown in FIGS. 1-5, a dynamic collaboration environment can be developed in integrated collaboration technology (ICTE) environment or by using other suitable means. One example of an ICTE is Microsoft Office Communicator 2005 (beta), available from Microsoft Corp, of Redmond, Wash., (http://www.microsoft.com/hk/office/rtc/client.mspx), shown in a system flow diagram in FIG. 1 illustrating the system 20 of the present invention.

The collaboration technology can be written in one or more programming languages, can be multi-threaded, subdivided into separated processes, and/or distributed among one or more computing devices/processors or an enterprise network. The collaboration technology can be deployed as a stand-alone program, in an application server, and/or as a resource (e.g., an object) accessible through one or more virtual networks. Finally, the collaboration process can be implemented in software, hardware or as a combination of hardware component(s) and software.

FIG. 1 is an exemplary illustration of the component parts of a virtual environment collaboration technology in various embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

In various embodiments, the collaboration technology can be implemented at least in part with one or more programming languages (e.g., Java™, C#, etc.). Of course, the scope of the present invention is not limited to any particular programming language or paradigm. In aspects of these embodiments, a collaboration technology may include one or more messaging software applications written in an open source language such as Java, the messaging software may be provided for example as Jabber messaging software (http://jabber.org) from the Jabber Software Foundation components deployed on one or more application servers, such the Microsoft Live Communications Server 2005, available from Microsoft Corp.

By way of illustration, as shown in FIG. 1 the present system 20 and method may implemented with the following components including a Collaborative application server 22 such as Microsoft Live Communications Server 2005 to provide collaboration applications to a first and a second virtual community, Virtual Community A (VC A) and Virtual Community B (VC B) at least two cross protocol servers 66, 68, a cross community proxy server 70, collaborative technology clients defined by specific clients 50, 52 associated with VC A, and 58, 60 associated with VC B that may be represented for example by a BuddySpace Chat client; and ad-hoc collaborative clients 46, 48 associated with VC A, and 54, 56 associated with VC B that may be represented for example by an mIRC collaboration client. Additionally, the collaborative technology clients may provide presence management collaboration technologies.

Information management servers 36 such as Boeing's Total Domain (http://brass.web.boeing.com/projects/totaldomain/) and LogicBlaze's ActiveMQ (http://www.activemq.org/site/home.html/) provide access to services.

Since the system of the present invention is open and pluggable, the components above can be replaced with other collaboration technologies including collaboration servers and collaboration clients. Other collaboration servers and clients can also be added to provide greater functionality.

In various embodiments, each cross protocol proxy server 66, 68 provides a communication medium for the virtual community participants. Participants can interact with each other through the cross protocol proxy server by utilizing a Collaborative Application Server (CAS) 22 such as is provided by Microsoft Office Communication 2005. In aspects of these embodiments, CAS functionality may be provided to participants through use of a Graphical User Interface associated with each of the collaboration clients. A selectable collaboration application software library may be provided, as one or more a object(s), and/or by any other suitable means.

The virtual environment 20 includes the at least one cross community proxy server (CCPS) 70 and may be implemented using technology such as Boeing's Total Domain provided by the Boeing Corporation https://brass.web.boeing.com/projects/totaldomain/) or LogicBlaze's ActiveMQ (http://www.activemq.org/site/home.html), that allows one or more collaborative communication technology to dynamically "plug into" the cross protocol proxy server layer by implementing a cross community proxy and thereby making the CCPS available to the CAS.

In various embodiments, multiple collaboration technologies can be supported concurrently by the cross community proxy server 70. This allows multiple collaboration technologies to be utilized such as, but not limited to instant messaging, chat rooms, and e-mail via the cross community proxy server 70.

Those of skill in the art will appreciate that a collaborative communication technology is a is not limited to providing network-based communication, but can be based on any method for exchanging information such as (but not limited to): inter- or intra-process communication, inter- or intra-processor communication, communication through shared memory or other storage systems, and other suitable communication links within a given computing device or within virtual communities of computing devices such as large enterprise networks.

The cross community proxy allows the CAS to access the functionality of multiple collaboration technologies in a collaboration technology independent fashion. Since each virtual community implements some or all of the collaboration technology applications, the collaborative technologies can be changed without requiring changes to the CAS. This allows for accommodation of new collaboration technologies as they become available since the nature of underlying protocols associated with each of the collaborative application technologies is hidden by the CAS employing the cross community protocol. Accordingly, the present disclosure is not limited to any particular collaboration technology protocol.

Those of skill in the art will appreciate that many such collaboration technologies are possible and fully within the scope and spirit of the present disclosure. For example, the system may use one or more of any of a number collaboration application protocols for example Instant Messaging (IM) protocols, such as Session Initiation Protocol (SIP), SIP for Instant Messaging and Presence Leveraging Extensions (SIMPLE), Extensive Messaging and Presence Protocol (XMPP).

One type of collaboration technology may be provided as a channel. A channel is responsible for transporting messages such as message packets from one virtual community to another virtual community and making the message packets available to participants within a virtual environment. Channels can provide asynchronous and/or synchronous communication. In the case of asynchronous communication, the channel can direct received messages to one or more virtual environment participants and can also direct sent messages from one or more registered virtual environment participates.

In various embodiments, a channel can be based on the Extensible Messaging and Presence Protocol (XMPP at http://www.xmpp.org), available from the Jabber Software Foundation (www.jabber.org). XMPP is an instant messaging protocol based on Extensible Markup Language (XML). An XMPP-based channel provider can communicate with a collaborative XMPP server to exchange messages with other participants within a virtual environment. Additionally, the XMPP server operates to propagate presence information, wherein the presence information allows a participant to find other participants having associated presence characteristics within a virtual environment.

Other implementations based on similar or different communication technologies are possible and fully within the scope and spirit of the present disclosure.

In an embodiment of the present invention, the system and method integrates specifically using open source messaging software called Jabber (http://jabber.org) to connect individual collaboration (specifically chat) technologies through use of XMPP. The technologies connect two different chat paradigms including, but not limited to: Instant Messaging (IM) and Room Based Chat. Specific technologies that may be used include Jabber (http://jabber.org), Microsoft Office Communicator 2005 (beta) (http://www.microsoft.com/hk/office/rtc/client.mspx), and Internet Relay Chat (IRC, http://www.irc.org/)

FIG. 2-5 illustrates a collaboration approach of the system 20 shown in FIG. 1 providing a virtual environment architecture having a system 20 for cross community and cross protocol communication in a virtual environment. The virtual environment 20 includes one or more virtual communities, virtual community A 42, and virtual community B 44 in collaborative communication with each other. The first virtual community 42 has a plurality of first clients 46, 48, 50, and 52 wherein the second virtual community also has a plurality of second clients 54, 56, 58, and 60. Each of the first clients 46, 48, 50 and 52 are in operative communication with each other through a first cross protocol proxy server 66. Additionally, each of the second clients 54, 56, 58, and 60 are in operative communication with each other through use of a second cross protocol proxy server 68. Each of the first clients are associated with either an ad-hoc collaborative technology or with a specific collaborative technology.

The clients 46, 48 associated with ad-hoc technology further have associated participant's 62a-d associated with the ad-hoc technology shown as point-to-point technology 1 associated with client 46 and point-to-point technology 2 associated with client 48. Additionally, individual participants 63a-d are associated with specific collaboration technology through client 50 representing discussion room technology A and with client 52 representing discussion room technology B. The system provides a collaborative virtual environment that operates to connect participants in one virtual community (VC A) with all participants in another virtual community (VC B) simultaneously with a reference in VC B that the collaboration message packet comes from VC A.

The clients 54, 56 associated with ad-hoc technology further have associated participant's 76a-d associated with the ad-hoc technology shown as point-to-point technology 3 associated with client 54 and point-to-point technology 4 associated with client 56. Additionally, individual participants 78a-d are associated with specific collaboration technology through client 58 representing discussion room technology C and with client 60 representing discussion room technology D.

The first and second cross protocol proxy servers 66, 68 operate within each of the respective first and second virtual communities to allow each of the participants 62a-d and 63a-d, and 76a-d and 78a-d to respectively communicate with each other across multiple collaborative application technology. Each of the participant's 62a-d and 63a-d are associated with a first Group user ID 80. Each of the participant's 76a-d and 78a-d are associated with a second Group user ID 82.

Figure 3:
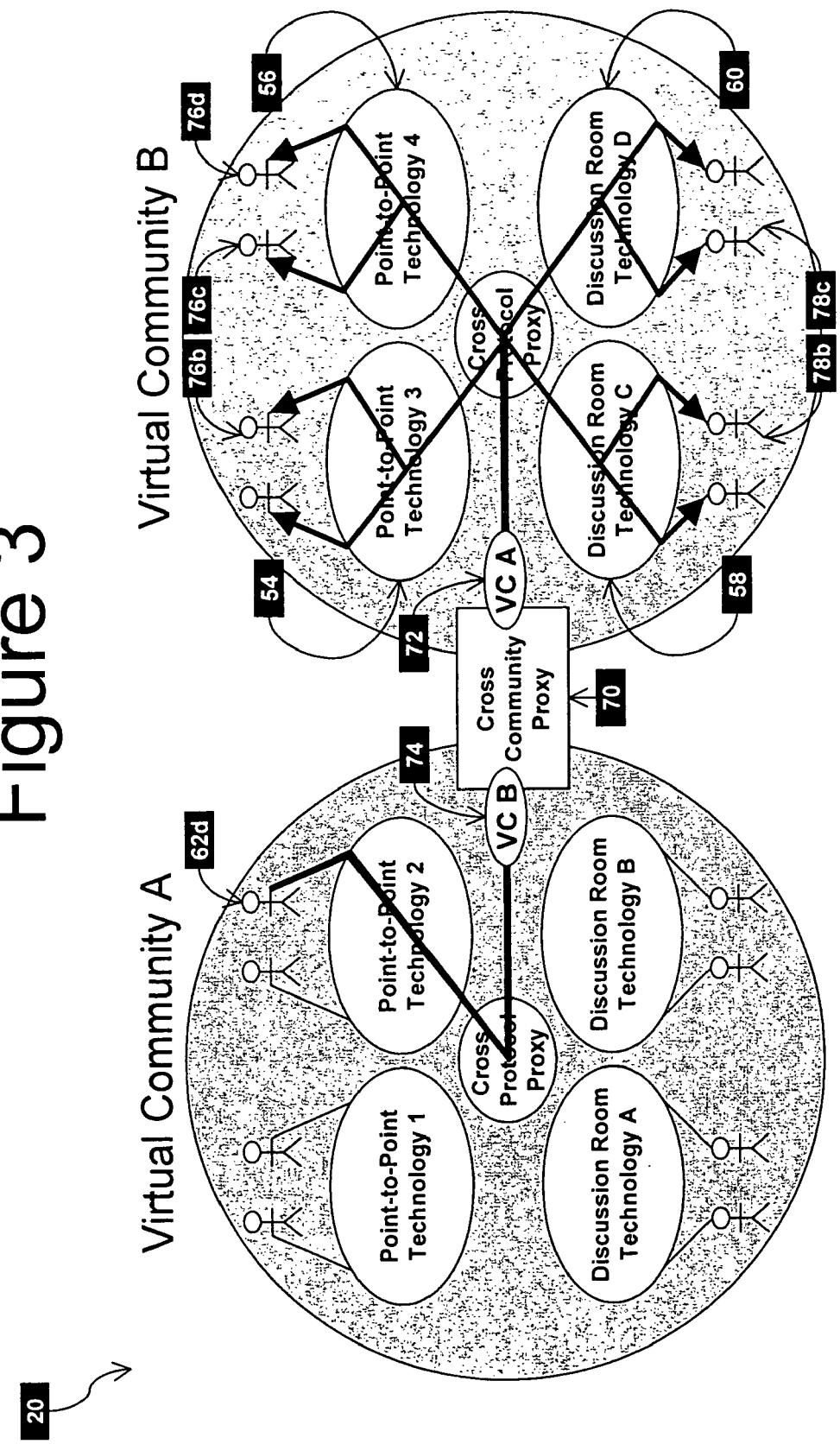
FIG. 3 illustrates flow of an information packet sent from a first virtual community to a second virtual community.

In operation, as shown in FIG. 3 an individual participant shown as 62d in FIG. 3 may send a message packet to each of the participants in the second virtual community B through use of both the first protocol proxy and the cross community proxy server, wherein the second protocol proxy server operates to distribute the message across multiple collaboration application technology within the second virtual community. An individual user ID of the participant 62d is suppressed and therefore transparent to each of the participants within the second virtual community such that it appears that the message packet VC A came from the first Group user ID 80.

Figure 4:
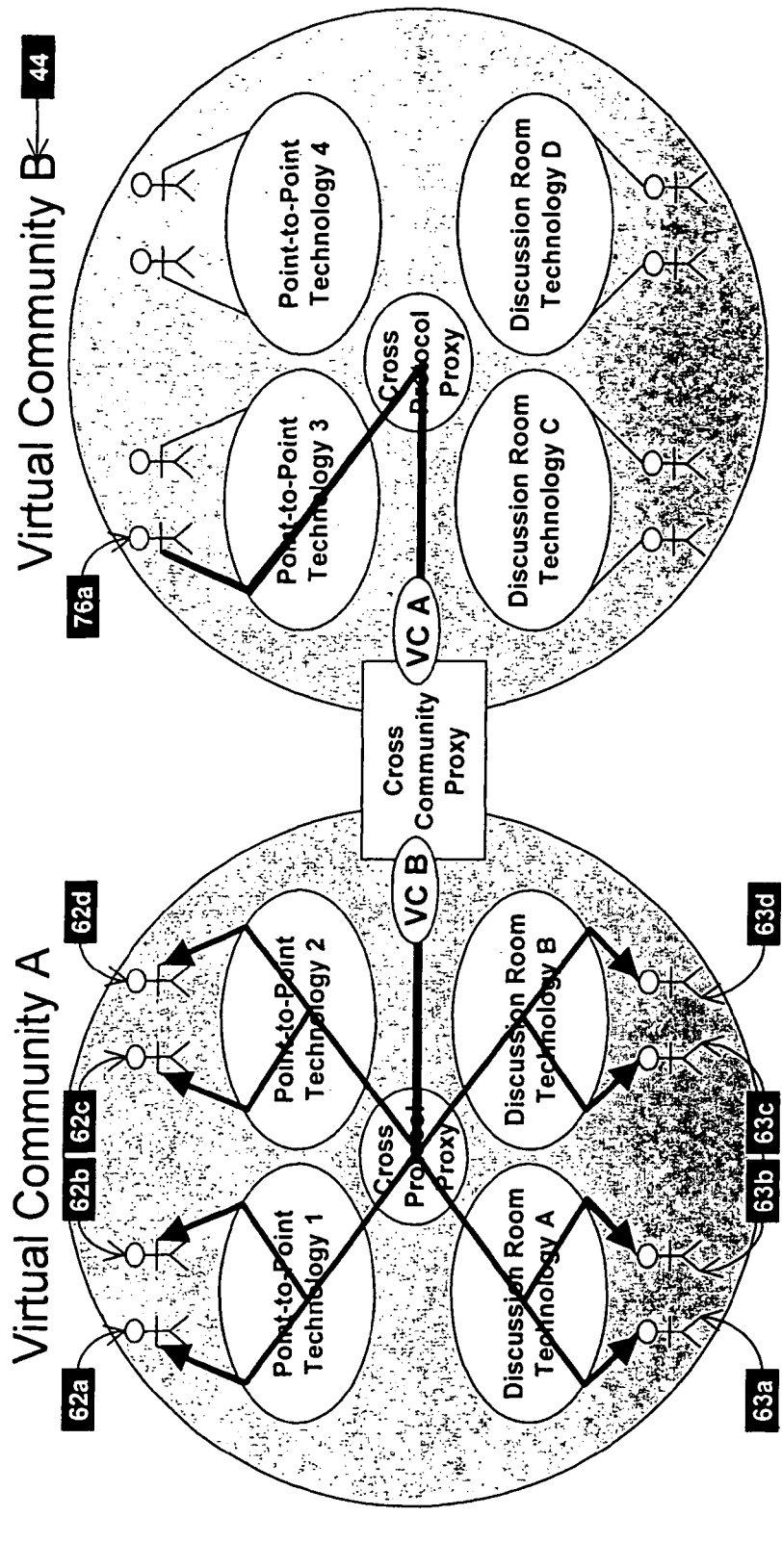
FIG. 4 illustrates flow of an information packet sent from a first virtual community to a second virtual community.

As shown in FIG. 4, the reverse scenario is true when a message packet is sent from a participant in the second virtual community to each of the participants in the first virtual community. Thus, the reverse is true for collaboration from VC B to VC A.

Figure 5:
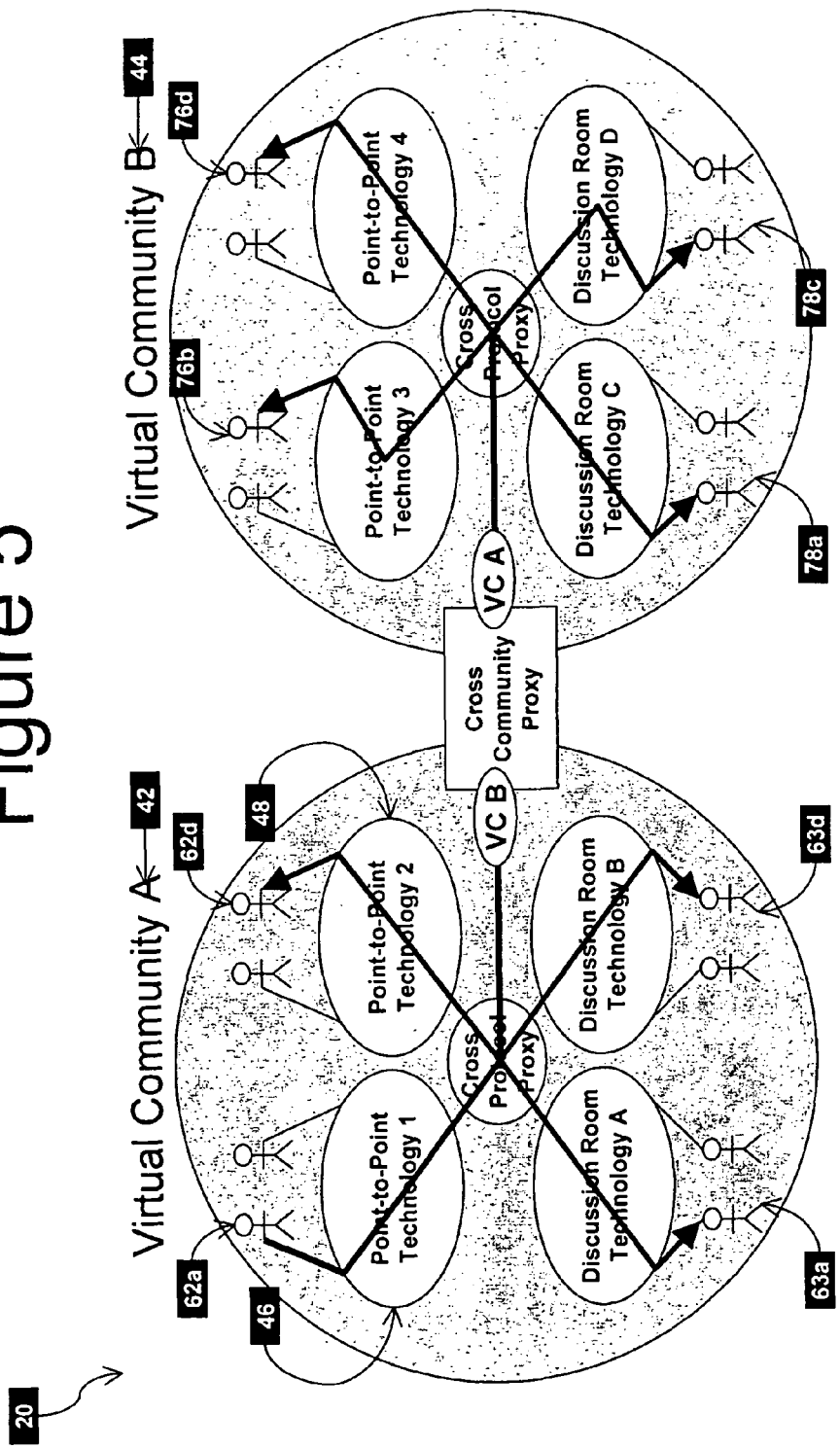
FIG. 5 illustrates a flow diagram of information shared within a virtual environment.

Additionally, FIG. 5 illustrates a collaboration method of the present invention used to connect selected participants within each of the first and second communities to each other using either the same or different collaboration technologies. Additionally, the collaboration method of the present invention may be used to connect selected groups of individuals within each of the virtual communities using different collaboration technologies.

In this regard, FIGS. 1-5 are block flow diagrams showing the flow of information using the methods, systems and program products according to the invention. It will be understood that each block, and combinations of blocks in the diagrams, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems, which perform the specified functions or steps, or combinations of special purpose hardware and computer instructions.

Various embodiments may be implemented using a conventional general purpose or a specialized digital computer or processor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

Various embodiments include a computer program product which is a storage medium (media) having instructions stored thereon/in which can be used to program a general purpose or specialized computing processor/device to perform any of the features presented herein. The storage medium can include, but is not limited to, one or more of the following: any type of physical media including floppy disks, optical discs, DVDs, CD-ROMs, microdrives, magneto-optical disks, ROMs, RAMs, EPROMs, EEPROMs, DRAMs, VRAMs, flash memory devices, magnetic or optical cards, nanosystems (including molecular memory ICs); paper or paper-based media; and any type of media or device suitable for storing instructions and/or data. Various embodiments include a computer program product that can be transmitted over one or more public and/or private networks wherein the transmission includes instructions which can be used to program a computing device to perform any of the features presented herein.

Stored on one or more of the computer readable medium (media), the present disclosure includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

While several aspects have been presented in the foregoing detailed description, it should be understood that a vast number of variations exist and these aspects are merely an example, and it is not intended to limit the scope, applicability or configuration of the invention in any way. Rather, the foregoing detailed description provides those of ordinary skill in the art with a convenient guide for implementing a desired aspect of the invention and various changes can be made in the function and arrangements of the aspects of the technology without departing from the spirit and scope of the appended claims.

What is claimed is:

1. A system for communications in a computer network virtual environment comprising:
   a first virtual community;
   at least one subsequent virtual community in collaborative communication using at least one collaborative technology with the first virtual community, wherein the first and at least one subsequent virtual community each have an associated at least one client in operative communication with at least one cross protocol proxy server and with at least one anonymous cross community proxy server;
   said at least one anonymous cross protocol proxy server comprising a first and at least a second proxy server that each operate to provide cross protocol communication between each associated client within each of the first and the at least one subsequent virtual communities; and
   said at least one anonymous cross community proxy server providing a cross community protocol for cross community synchronous and/or asynchronous communications between each of the first and the subsequent virtual communities, said cross community communication comprising said collaborative communication identified by said anonymous cross community proxy server operates to hide information about an individual user ID but identifies the Group User ID to the recipient participants within the remote virtual community, said collaborative communication comprising ad-hoc log-in by said group.

2. The system of claim 1, further comprising:
   a plurality of subsequent virtual communities.

3. The system of claim 1, wherein the at least one subsequent virtual community comprises:
   at least one second virtual community.

4. The system of claim 1, wherein the first virtual community and subsequent virtual communities define the virtual environment.

5. The system of claim 1, wherein the clients further comprise:
   specific collaborative technology associated with one or more groups of individual participants.

6. The system of claim 1, wherein the clients comprise:
   ad-hoc collaborative technology associated with one or more individual participants.

7. The system of claim 1, further comprising:
   a first Group User Identification (ID) associated with said group of individual participants within the first virtual community.

8. The system of claim 7, further comprising:
   a first message packet associated with the first Group User ID communicated from the first virtual community to the at least a second virtual community.

9. The system of claim 1, further comprising:
   at least a second Group User Identification (ID) associated with said group of individual participants within the at least one subsequent virtual community.

10. The system of claim 9, further comprising:
    at least a second message packet associated with at least a second Group User ID communicated from the at least one subsequent virtual community to the first virtual community.

11. The system of claim 1, further comprising:
    a plurality of clients each respectively associated with the first and the at least one subsequent virtual community.

12. The system of claim 11, wherein the first cross protocol proxy server provides the ability of each of the plurality of clients within the first virtual community to communicate with each other within the first virtual community independent of collaboration application technology protocols used by each of the respective clients.

13. The system of claim 11, wherein the at least a second cross protocol proxy server provides the ability of each of the plurality of clients within the subsequent virtual community to communicate with each other within the subsequent virtual community independent of collaboration application technology protocols used by each of the respective clients.

14. The system of claim 1, wherein the at least one cross proxy community server operates to allow clients within the first virtual community to communicate with clients within at least a second virtual community across different communication protocols.

15. The system of claim 1, wherein the cross community proxy server allows each client within each of the first and subsequent virtual communities respectively to log-in to each of the virtual communities collectively using a Group User ID.

16. A Method for communicating within a computer network virtual environment comprising the steps:

providing a first virtual community comprising a first computer network having a plurality of clients associated with the first virtual community;

providing at least a subsequent virtual community comprising at least a second computer network having a plurality of clients associated with the subsequent virtual community;

using an anonymous cross community proxy server to send at least one collaborative technology message packet comprising synchronous and/or asynchronous communication between the first and the subsequent virtual communities wherein said message packet is identified by said anonymous cross community proxy server operates to hide information about an individual user ID but identifies the Group User ID to the recipient participants within the remote virtual community, said collaborative communication comprising ad-hoc log-in by said group.

17. The method of claim 16, further comprising the steps of:

associating said group of individual participants within each of the first and the subsequent virtual communities respectively with a first and at least a second Group User ID.

18. The method of claim 17, further comprising the steps of:

communicating a first message packet associated with the first Group User ID from the first virtual community to at least a second virtual community.

19. The method of claim 17, further comprising the steps of:

communicating at least a second message packet associated with the subsequent Group User ID from the subsequent virtual community to the subsequent virtual community.

20. The method of claim 16, further comprising the step of:

associating an individual participant user ID with said group of individual participants within each of the virtual communities; and suppressing an individual participant's user ID from the message packet sent from an associated individual participant within one of either the first or the subsequent virtual communities.

21. A method of communicating within a computer network virtual environment comprising the steps of:

providing a first virtual community comprising a first computer network having a plurality of clients associated with the first virtual community;

providing at least a subsequent virtual community comprising at least a second computer network having a plurality of clients associated with the subsequent virtual community, wherein the first and the subsequent virtual communities define the virtual environment; and sending at least one collaborative technology message packet comprising synchronous and/or asynchronous communication to individual participants within the virtual environment from a sending virtual community via an anonymous cross community proxy server operates to hide information about an individual user ID but identifies the Group User ID to the recipient participants within the remote virtual community, said collaborative communication comprising ad-hoc log-in by said group.

* * * * *